(12) United States Patent
Eugster

(10) Patent No.: US 6,595,106 B2
(45) Date of Patent: Jul. 22, 2003

(54) MAGAZINE FOR ESPRESSO COFFEE CAPSULES

(75) Inventor: Arthur Eugster, Romanshorn (CH)

(73) Assignee: Eugster/Frismag AG, Romanshorn (CH)

(*) Notice: Subject to any disclaimer, the term of this patent is extended or adjusted under 35 U.S.C. 154(b) by 0 days.

(21) Appl. No.: 09/952,895

(22) Filed: Sep. 14, 2001

(65) Prior Publication Data

US 2002/0031588 A1 Mar. 14, 2002

(30) Foreign Application Priority Data

Sep. 14, 2000 (DE) ..................... 200 15 903 U

(51) Int. Cl.⁷ ............... A47J 31/00; G07F 11/16
(52) U.S. Cl. ............. 99/289 R; 99/290; 99/295; 221/199; 221/309
(58) Field of Search .............. 99/295, 280, 289 R, 99/289 P, 290, 387; 221/199, 303, 309

(56) References Cited

U.S. PATENT DOCUMENTS

| | | | | |
|---|---|---|---|---|
| 1,576,010 A | * | 3/1926 | Swartz | 221/303 |
| 3,200,925 A | * | 8/1965 | Swaney | 221/199 |
| 3,295,998 A | | 1/1967 | Goros | |
| 3,440,951 A | | 4/1969 | Barrera | |
| 3,604,592 A | * | 9/1971 | Bacon et al. | 221/303 X |

FOREIGN PATENT DOCUMENTS

| | | |
|---|---|---|
| DE | 2 256 557 | 5/1973 |
| DE | 690 28 628 | 1/1992 |
| EP | 1 002 490 | 5/2000 |
| FR | 2 310 733 | 10/1976 |

OTHER PUBLICATIONS

PCT Publication No. WO94/03092, Feb. 17, 1994.

* cited by examiner

Primary Examiner—Reginald L. Alexander
(74) Attorney, Agent, or Firm—Koda & Androlia

(57) ABSTRACT

Espresso coffee capsules (2, 2a) having an essentially rotationally symmetric shape, especially the frustum of a right cone, being fitted and slide into an essentially cylindrical magazine tube (1) of a magazine which can be set up vertically. The espresso coffee capsules can be stacked in the magazine tube (1). The magazine tube (1) has a removal opening (4) at the bottom, allowing the espresso coffee capsules to be removed. The magazine tube (1) has, at the top (5), an insertion guide (6) that has a side insertion opening (7) so that the espresso coffee capsules can be inserted simply and exactly into the magazine tube.

8 Claims, 6 Drawing Sheets

MAGAZINE FOR ESPRESSO COFFEE CAPSULES

BACKGROUND OF THE INVENTION

1. Field of the Invention

The present invention relates to a magazine for espresso coffee capsules that has at least one essentially cylindrical magazine tube, which can be set up vertically.

2. Prior Art

To simplify the process of filling the brewing chamber of espresso machines with ground coffee, increasing use is being made of the known espresso coffee capsules which are filled with premeasured portions of ground coffee. The espresso coffee capsules are industrially made and are filled, immediately after the ground coffee undergoes the grinding process, with a measured amount of it and hermetically sealed. The known espresso coffee capsules are usually deep-drawn out of a plastic film and have essentially the shape of a frustum of a right circular cone, with the base of the frustum of the cone forming the bottom of the espresso coffee capsules. The bottom of the espresso coffee capsule can have an edge projecting from the side that serves as a bottom for fastening a metal foil.

The espresso coffee capsules can have various varieties of coffee therein, in order to store it and keep its aroma fresh in a simple manner. At present, about ten different varieties of coffee are commercially available in espresso coffee capsules. It has turned out to be expedient to store the espresso coffee capsules with the various varieties of coffee in order in a magazine. An essential component of such a magazine is an essentially cylindrical, normally vertically arranged magazine tube which, according to the state of the art, is completely open on top and can have a removal opening at the bottom. The magazine tube can have several espresso coffee capsules in it stacked one above the other. A number of magazine tubes, for example six, can be combined, according to the state of the art, into a rotating magazine. However, it is also conceivable for a series of magazine tubes to be linearly arranged next to one another.

In any case, care should be taken when filling the magazine tubes that the espresso coffee capsules are only placed into the magazine tube in a desired intended orientation, so that it is also easier to manipulate them when they are removed and after that. In particular, it should not happen that some of the espresso coffee capsules placed into a magazine tube are standing on their tops, i.e. upside down.

Next, an espresso coffee capsule taken from the removal opening of a magazine tube can be inserted into an espresso machine's brewing chamber that is designed to hold this capsule. When the brewing chamber is closed, the top of the espresso coffee capsule is punctured by a water delivery element. The bottom of the espresso coffee capsule is designed to tear once a predetermined brewing water pressure of about six bars, for example, is reached or exceeded, so that the brewing process can take place.

SUMMARY OF THE INVENTION

This object of the present invention is to provide a magazine for espresso coffee capsules in which the espresso coffee capsules can be put therein without requiring great attention so that the capsules are stacked in their intended orientation and can easily be removed from it and used.

The above object is accomplished by a magazine provided with an insertion guide that has a side insertion opening that allows for the espresso coffee capsule to be inserted into the magazine tube correctly and not, for example, in such a way that it is positioned upside down in the magazine tube. This also makes it convenient to insert the capsule into the magazine tube when the espresso coffee capsule is guided into the hood. Thus, the magazine tube can be filled without great attention.

To make the orientation of the espresso coffee capsule in the insertion guide especially exact, the insertion guide is designed as a hood which is shaped, where it abuts the side insertion opening on the inside, essentially the same as half a capsule, as defined by a vertical section through the middle of the capsule. This hood is also esthetically pleasing.

In order for the insertion guide, which is designed as a hood, to fit together with the espresso coffee capsules, which have an edge projecting from the sides on the bottom, the insertion guide has a groove inside thereof so that the groove runs in the peripheral direction and opens toward the insertion opening and downward, thus holding the edge of the espresso coffee capsules. Overall, the diameter of the espresso coffee capsules is biggest at the edge and tapers upward in the direction of the height of the espresso coffee capsules. Therefore, though the espresso coffee capsule has the projecting edge, the espresso coffee capsule inserted in the insertion guide can fall unhindered but automatically guided vertically downward into the magazine tube, and then they are removed from the lower removal opening of the magazine tube.

Furthermore, a magazine having an insertion guide is provided with a plurality of, for instance five or six, magazine tubes in a row, so that each of them can be loaded with capsules correctly and in order, with each magazine tube storing only capsules with a particular kind of coffee.

A rotating magazine has a plurality of, for instance five to six, magazine tubes arranged in a circle. The rotating magazine has advantages that each selected magazine tube that contains the respective espresso coffee capsules of a certain variety of coffee can be rotated to a predetermined removal place. It is advantageous for each of these magazine tubes that are installed in the rotating magazine to have an insertion guide, which is thus safely assigned to exactly one magazine tube. Instead, it is also conceivable to have only a single insertion guide that is solidly arranged on a magazine and used for all magazine tubes, which can be rotated under a hood one after the other to be filled, which allows savings by reducing the number of insertion guides.

Further, in the present invention, the magazine, which has at least one magazine tube with an insertion guide, can be designed as an independent unit that can be set up vertically independently of an espresso machine but can also be compactly integrated into an espresso machine.

BRIEF DESCRIPTION OF THE DRAWINGS

The present invention will be described below with reference to the accompanying drawings that present advantages and features of the present invention wherein.

DETAILED DESCRIPTION OF THE INVENTION

Figure 1:
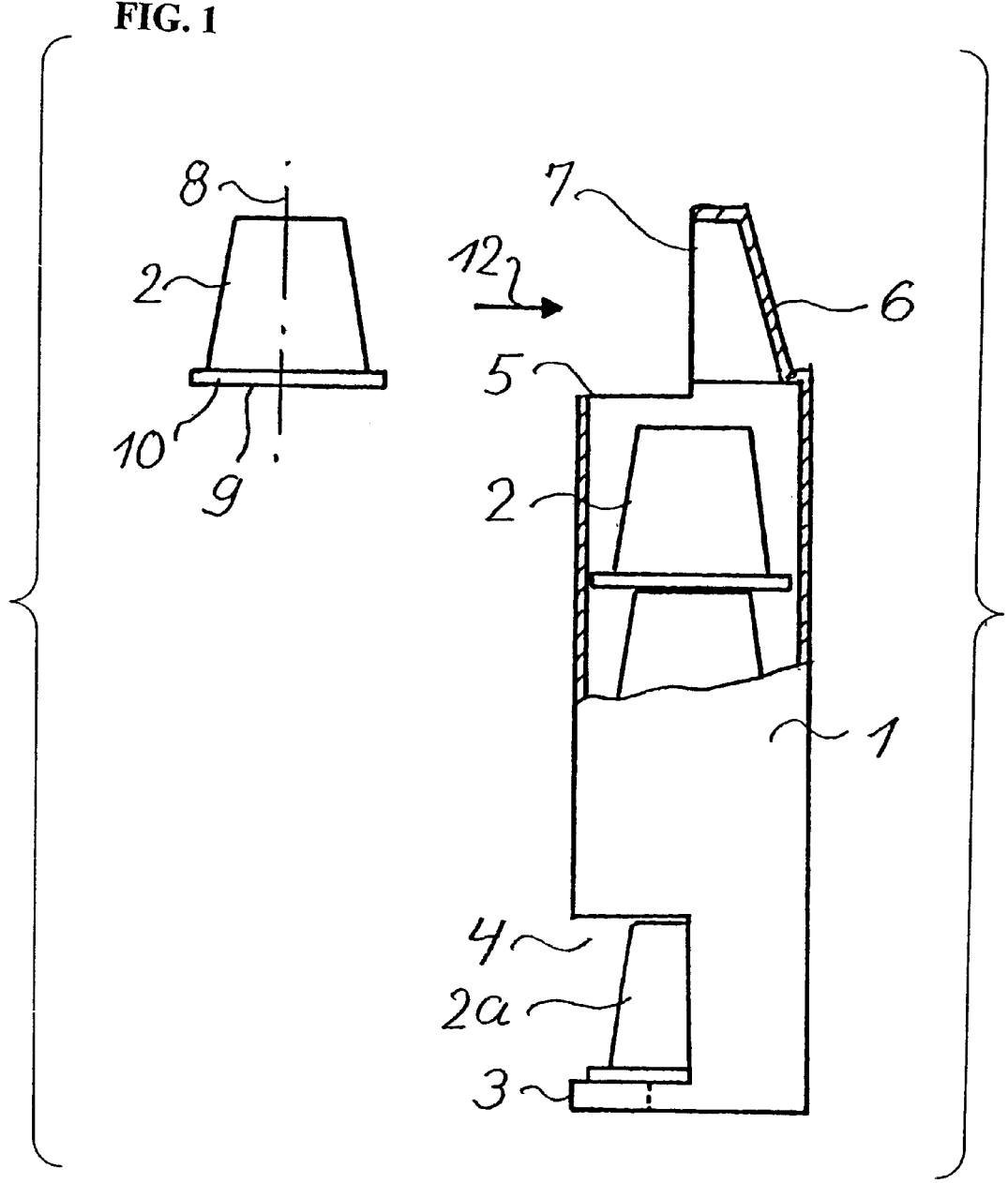
FIG. 1 is a partially cross sectional side view of a magazine tube with an insertion guide.
Figure 2:
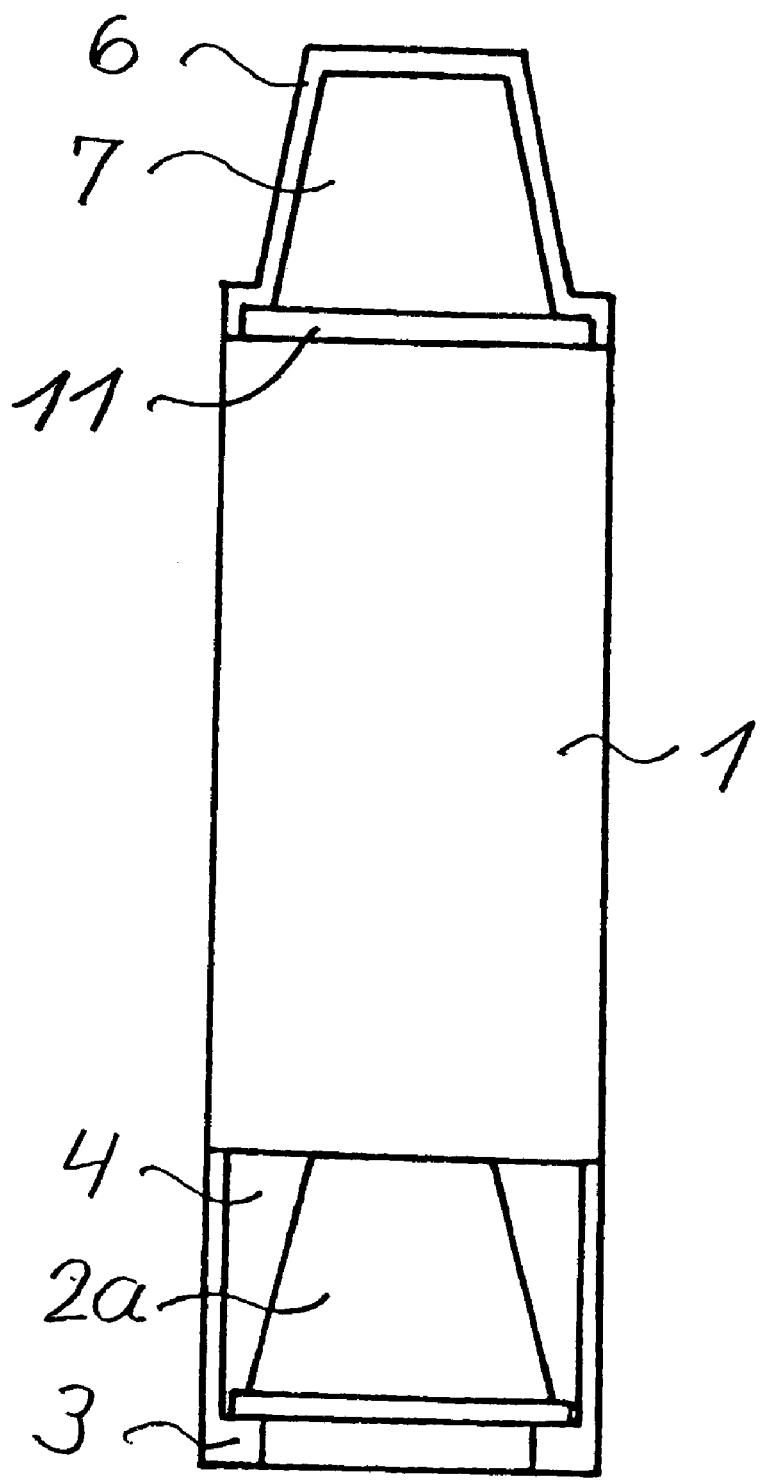
FIG. 2 is a front view of the magazine tube in FIG. 1.

FIGS. 1 and 2 show an essentially cylindrical magazine tube 1 in which several espresso coffee capsules 2 can be stacked on top of one another. The magazine tube 1 has, in the area of its bottom 3, a removal opening 4 from which the bottom espresso coffee capsule 2a can always be pulled out. On its top 5, the magazine tube 1 has an insertion guide 6 in a form of a hood that is securely connected to the magazine tube 1.

The hood-shaped insertion guide 6 has a side insertion opening 7, and the inside thereof where it abuts the opening 7 is shaped essentially the same as half a capsule as can be seen from FIG. 1. The insertion guide 6 is closed at the top, which, however, is not absolutely necessary.

The espresso coffee capsule 2 is symmetric about its vertical axis 8 and is shaped essentially as a frustum of a right cone. A round bottom 9 of the espresso coffee capsule 2 is enlarged by an edge 10 that projects radially outward. The edge 10 serves to hold a closing device of sheet metal (not marked) or an espresso coffee capsule 2 containing ground coffees. Corresponding to this edge 10, the insertion guide 6 has, as can be seen from FIG. 2, inside on its lower side, which gradually changes into the magazine tube 1, a downward opening groove 11 which ends at insertion opening 7.

When the magazine 1 is filled, the espresso coffee capsules 2 are inserted in the direction of arrow 12 in FIG. 1 through insertion opening 7 into the insertion guide, with edge 10 of the espresso coffee capsule being inserted into groove 11. In the final position that is then reached, half of the espresso coffee capsule, i.e., the half lying to the right of the vertical axis in the top left part of FIG. 1, makes a largely positive fit with the inside surface of the hood-shaped insertion guide 6. This exactly orients the espresso coffee capsule over the top of the magazine tube. When the espresso coffee capsule 2 is released, it falls straight down onto the bottom 3 of the magazine tube or onto the upper espresso coffee capsule already set inside the magazine tube 1.

After that, the espresso coffee capsules are removed one after the other, always in order, from the removal opening 4 of the magazine tubes 1.

Figure 3:
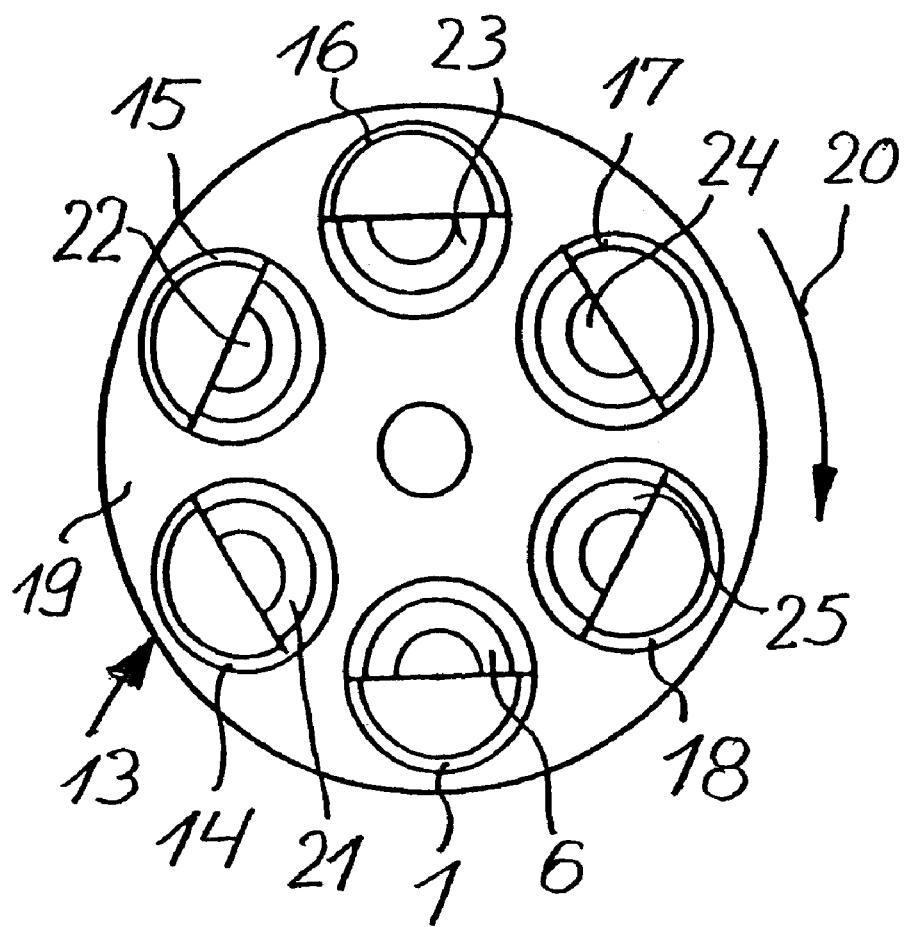
FIG. 3 is a top view of the first embodiment of a magazine of the present invention.

FIG. 3 shows a top view of a first embodiment of a rotating magazine 13, which has, in addition to cylindrical magazine tube 1 shown in FIGS. 1 and 2, five other magazine tubes 14–18, which are arranged in a fixed manner on a carrier 19, equidistant to one another in the direction around the periphery of rotating magazine 13, in particular which sit on this round carrier 19. The carrier 19 can be rotated with the magazine tubes 1 and 14–18 in the direction of an arrow 20, so that each magazine tube can be put into a selected position. Each magazine tube 1 and 14–18 is designed like magazine tube 1 shown in FIGS. 1 and 2, with it only being possible to replace bottom 3 by joint carrier 19, and each having a hood-shaped insertion guide 6 and 21–25 on top which is shaped like insertion guide 6 in FIGS. 1 and 2. In a selected rotation position, the removal opening 4 of the magazine tube 1 and the side insertion opening 7 of its insertion guide 6 (see FIGS. 1 and 2) are especially easily accessible. However, it might also be possible, depending on how the rotating magazine 13 is installed, to reach the side openings of the other insertion guides 21–25 and the removal openings of the magazine tubes 14–18 more or less well, without necessarily having to move the rotating magazine.

Figure 4A:
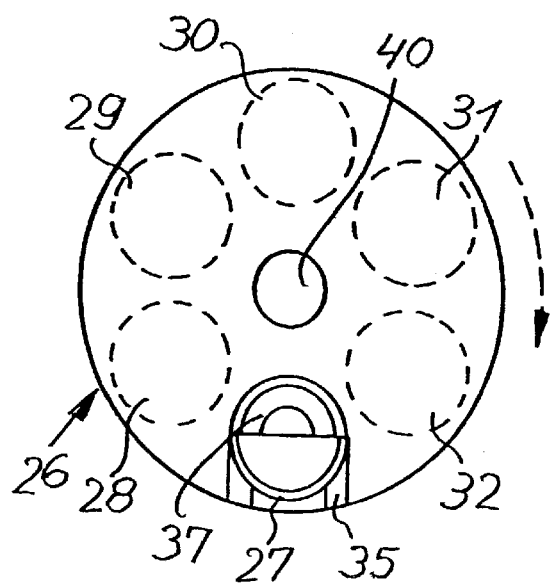
FIG. 4A is a top view of the second embodiment of a rotating magazine of the present invention.
Figure 4B:
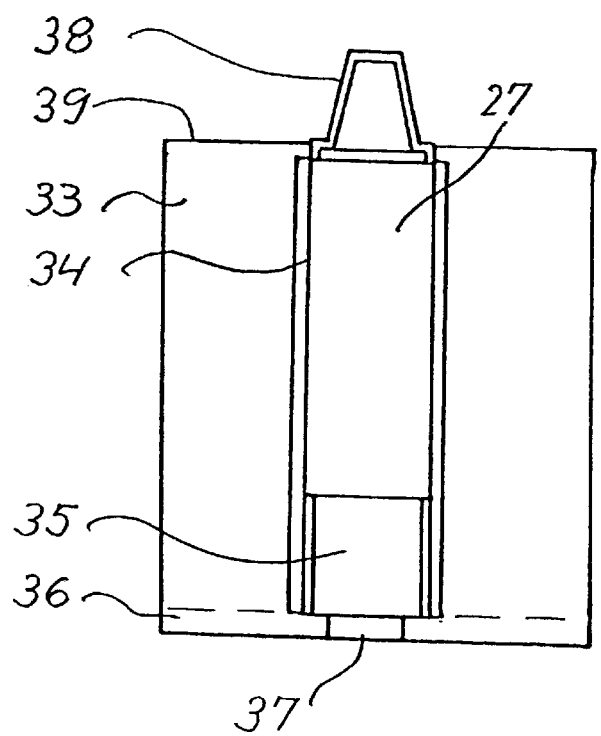
FIG. 4B is a side view thereof.

The rotating magazine 26 of the second embodiment shown in FIGS. 4A and 4B has six cylindrical magazine tubes 27–32 arranged equidistant around the periphery of an essentially cylindrical housing 33 so that they can rotate. Housing 33 has a slit-shaped opening 34 formed in its cylindrical wall, which corresponds, at least below, to a removal opening 35 in magazine tube 27. In FIG. 4B, a base 36 of the housing 33 also has a cutout 37 for removing espresso coffee capsules (not shown) from the magazine tube 27. It is essential that in this embodiment, only a single hood-shaped insertion guide 38 is provided in a fixed manner in the top 3 of the housing 33, and this insertion guide 38 is radially displaced inward from the housing opening 34 so that a magazine tube, e.g. the magazine tube 27, rotated by a turning knob 40, is located below the insertion guide 38.

Figure 5:
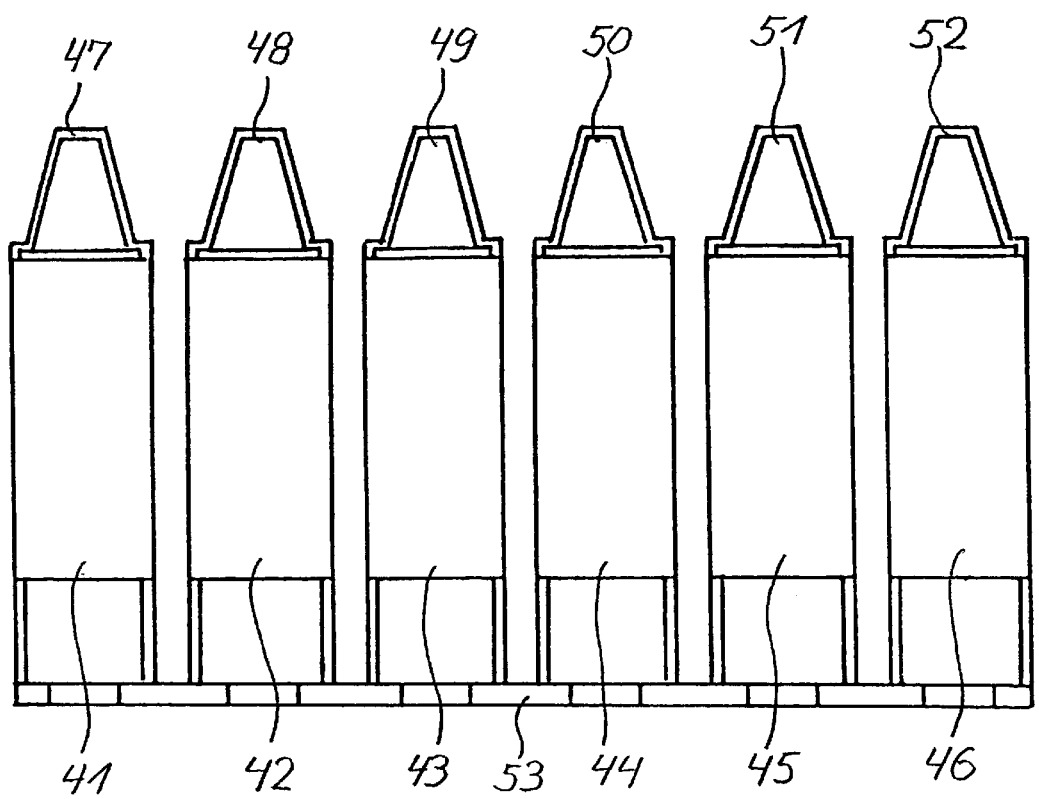
FIG. 5 is a side view of a magazine with several magazine tubes arranged m a row.
Figure 6:
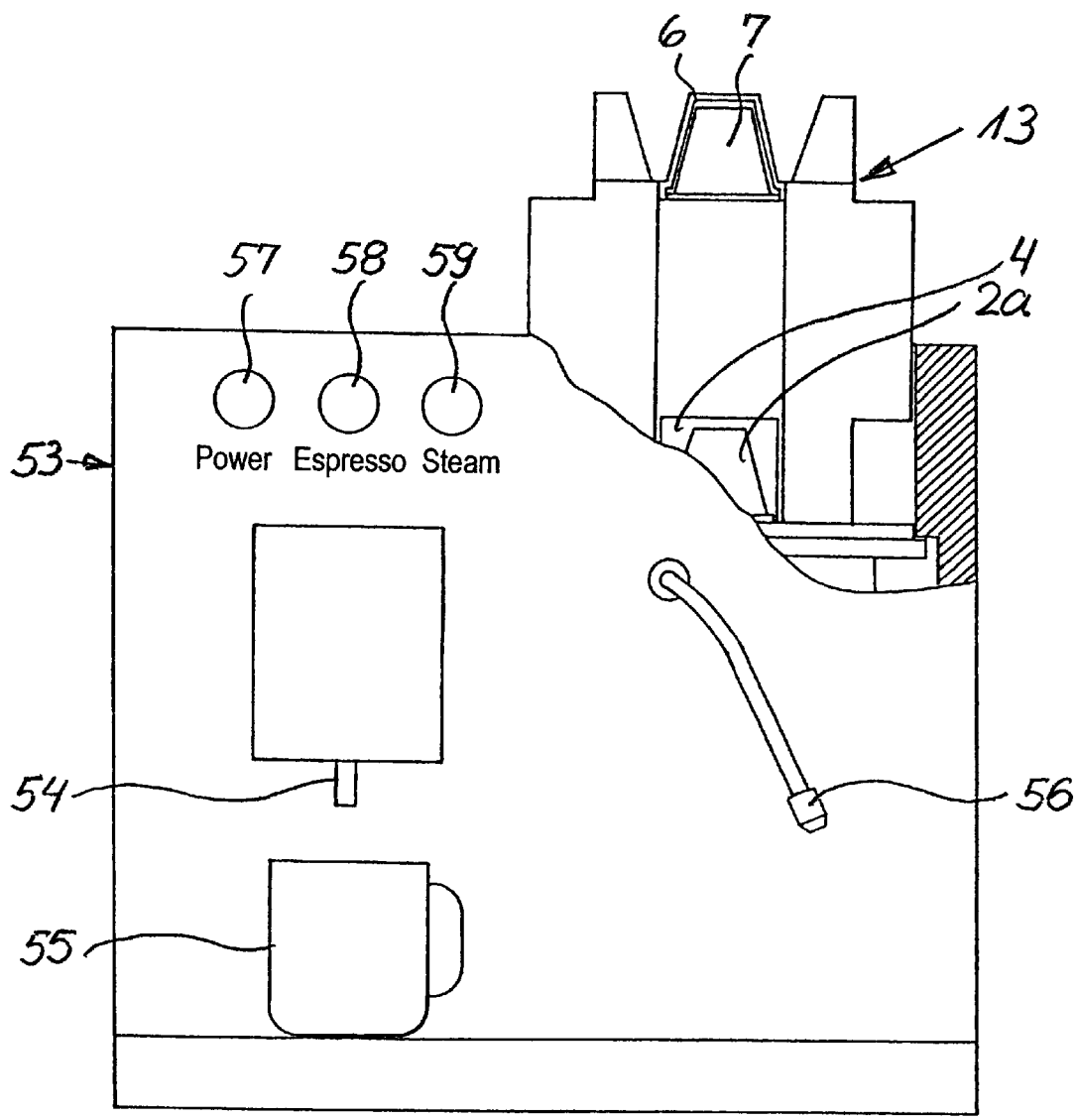
FIG. 6 is a front view, partially broken of an espresso machine encompassing the fist embodiment of a rotating magazine of the present invention.

FIG. 5 shows a row-shaped arrangement of six magazine tubes 41–46, each of which has a hood-shaped insertion guide 47–52 on the top. In this arrangement, unmarked removal openings are made in a joint base 53 toward the same side of the base, with joint base 53 replacing the bottom 3 shown in FIGS. 1 and 2. Also, the unmarked cutouts of the hood-shaped insertion guides 37–52 are oriented toward the same side. Otherwise, the design of each magazine tube 41–46 with insertion guide 47–52 corresponds to that of magazine tube 1 and to insertion guide 6 shown in FIGS. 1 and 2.

What is claimed is:

1. A magazine for espresso coffee capsules with at least one essentially cylindrical magazine tube, which can be set vertically and into which espresso coffee capsules having an essentially symmetric shape about an axis thereof, especially the frustum of a right cone, can fit and slide and can be stacked in said magazine tube, with a removal opening provided in a bottom of said magazine tube, wherein said magazine tube is provided with, at a top thereof, an insertion guide that has a side insertion opening; and said insertion guide comprising means for insuring that said espresso coffee capsules are stacked in said magazine in a proper orientation.

2. A magazine for espresso coffee capsules wit at least one essentially cylindrical magazine tube, which can be set vertically and into which espresso coffee capsules having an essentially symmetric shape about an axis thereof, especially the frustum of a right cone, can fit and slide and can be stacked in said magazine tube, with a removal opening provided in a bottom of said magazine tube, wherein said magazine tube is provided with, at a top thereof, an insertion guide That has a side insertion opening; and said insertion guide is designed as a hood and is shaped on an inside thereof, where it abuts the side opening, essentially the same as half a capsule, as defined by a vertical section through the middle of said capsule.

3. The magazine according to claim 2, wherein said insertion guide designed as a hood is provided with a groove inside thereof so as to extend in a peripheral direction thereof and open toward said insertion opening and downward, said insertion guide being capable of holding an edge projecting at a bottom of each of said espresso coffee capsules.

4. The magazine according to claim 2, wherein said insertion guide designed as a hood is closed at a top thereof.

5. The magazine according to claim 3, wherein said insertion guide designed as a hood is closed at a top thereof.

6. A magazine for espresso coffee capsules with at least one essentially cylindrical magazine tube, which can be set vertically and into which espresso coffee capsules having an essentially symmetric shape about an axis thereof, especially the frustum of a right cone, can fit and slide and can be stacked in said magazine tube, with a removal opening provided in a bottom of said magazine tube, wherein said magazine tube is provided with, at a top thereof, an insertion guide that has a side insertion opening; and said magazine comprises a plurality of magazine tubes arranged in a row, each having an insertion guide.

7. A magazine for espresso coffee capsules with at least one essentially cylindrical magazine tube, which can be set vertically and into which espresso coffee capsules having an essentially symmetric shape about an axis thereof, especially the frustum of a right cone, can fit and slide and on be stacked in said magazine tube, with a removal opening provided in a bottom of said magazine tube, wherein said magazine tube is provided with, at a top thereof, an insertion guide that has a side insertion opening; and said magazine is designed as a rotating magazine which comprises several magazine tubes and can be filled only in one rotating position inter an insertion guide that is arranged in a fixed manner.

8. The magazine according to any one of claims 2–7, wherein said magazine is integrated into an espresso machine.

\* \* \* \* \*